United States Patent
Kardos et al.

(10) Patent No.: US 8,695,340 B2
(45) Date of Patent: Apr. 15, 2014

(54) ARRANGEMENT AT A SUPERCHARGED COMBUSTION ENGINE

(75) Inventors: Zoltan Kardos, Södertälje (SE); Erik Söderberg, Stockholm (SE); Hans Wikström, Johanneshov (SE)

(73) Assignee: Scania CV AB (SE)

( * ) Notice: Subject to any disclaimer, the term of this patent is extended or adjusted under 35 U.S.C. 154(b) by 518 days.

(21) Appl. No.: 12/741,625

(22) PCT Filed: Nov. 6, 2008

(86) PCT No.: PCT/SE2008/052166
§ 371 (c)(1),
(2), (4) Date: May 6, 2010

(87) PCT Pub. No.: WO2009/064242
PCT Pub. Date: May 22, 2009

(65) Prior Publication Data
US 2010/0263369 A1    Oct. 21, 2010

(30) Foreign Application Priority Data

Nov. 16, 2007   (SE) ...................................... 0702524

(51) Int. Cl.
*F02B 29/04*    (2006.01)
*F02B 33/44*    (2006.01)
*F02B 47/08*    (2006.01)
*F02M 25/07*    (2006.01)

(52) U.S. Cl.
USPC ............. 60/605.2; 60/599; 60/605.1; 60/612; 123/568.12

(58) Field of Classification Search
USPC ..................... 60/278, 599, 605.1, 605.2, 612; 123/568.12
See application file for complete search history.

(56) References Cited

U.S. PATENT DOCUMENTS

| 5,269,143 | A | 12/1993 | Cikanek et al. | |
| 6,883,314 | B2 * | 4/2005 | Callas et al. | 60/599 |
| 8,028,522 | B2 * | 10/2011 | Irmler et al. | 60/599 |
| 2005/0039711 | A1 | 2/2005 | Bryant | |
| 2006/0037590 | A1 | 2/2006 | Uzkan et al. | |
| 2006/0185362 | A1 | 8/2006 | Rogg et al. | |
| 2007/0193270 | A1 | 8/2007 | Roozenboom et al. | |

FOREIGN PATENT DOCUMENTS

| WO | WO 2007028591 A2 * | 3/2007 | F01P 1/00 |
| WO | WO 2008/069743 A1 | 6/2008 | |
| WO | WO 2009002233 A1 * | 12/2008 | F02B 29/04 |

OTHER PUBLICATIONS

International Search Report dated Feb. 26, 2009, issued in corresponding international application No. PCT/SE2008/051266.

* cited by examiner

Primary Examiner — Audrey K Bradley
(74) Attorney, Agent, or Firm — Ostrolenk Faber LLP

(57) ABSTRACT

An arrangement for a supercharged combustion engine includes a first compressor compressing air in the engine air inlet line as a first stage and a second compressor compressing the air in the inlet line as a second stage, a first coolant-cooled charge air cooler cooling the air after it has been compressed in the first stage and before it is compressed in the second stage, and an air-cooled charge air cooler cooling the compressed air when it has been compressed by the first stage, a second coolant-cooled charge air cooler cooling the compressed air after it has been compressed in the second stage and before it is compressed in the air-cooled charge air cooler. Exhaust gases in an exhaust line from the engine drive turbines which operate the compressors. A return line from the exhaust line and connected into the inlet line has a cooler for the exhaust gases before mixing the gases with the inlet air.

13 Claims, 4 Drawing Sheets

ARRANGEMENT AT A SUPERCHARGED COMBUSTION ENGINE

CROSS REFERENCE TO RELATED APPLICATION

The present application is a 35 U.S.C. §§371 national phase conversion of PCT/SE2008/051266, filed Nov. 6, 2008, which claims priority of Swedish Application No. 0702524-0, filed Nov. 16, 2007, the disclosure of which is incorporated by reference herein. The PCT International Application was published in the English language.

BACKGROUND TO THE INVENTION, AND STATE OF THE ART

The present invention relates to an arrangement for a supercharged combustion engine and particularly to the supply of exhaust gases mixed with air to the engine.

The technique called EGR (Exhaust Gas Recirculation) is a known way of leading part of the exhaust gases from a combustion process in a combustion engine back, via a return line, to an inlet line for supply of air to the combustion engine. A mixture of air and exhaust gases is thus supplied via the inlet line to the engine's cylinders in which the combustion takes place. Adding exhaust gases to the air causes a lower combustion temperature which results inter alia in a reduced content of nitrogen oxides ($NO_x$) in the exhaust gases. This technique is used for both Otto engines and diesel engines.

Optimum use of this technique entails recirculation of relatively large amounts of exhaust gases. The recirculating exhaust gases are therefore cooled in at least one EGR cooler to reduce the specific volume of the exhaust gases before they are mixed with air and led to the combustion engine. Conventional EGR coolers use the coolant of the vehicle's ordinary cooling system for cooling the combustion engine. Another known practice is to use air-cooled EGR coolers in which the exhaust gases are cooled by air which is at the temperature of the surroundings, thereby allowing the recirculating exhaust gases to be cooled to a temperature substantially corresponding to the temperature of the surroundings. The recirculating exhaust gases can thus be subjected to a substantially optimum reduction in specific volume so that a large amount of exhaust gases can be recirculated into the combustion engine.

The amount of air which can be supplied to a supercharged combustion engine depends on the pressure of the air but also on the temperature of the air. Supplying the largest possible amount of air to the combustion engine entails the air being first compressed by a compressor before being cooled in a charge air cooler and thereafter being led to the combustion engine. The compressed air is usually cooled in the charge air cooler by surrounding air. The compressed air can thus be cooled to a temperature which exceeds the temperature of the surroundings by only a few degrees. Despite the air being compressed and cooled as described above, this is not usually sufficient for providing the necessary amount of air which together with the recirculating exhaust gases will enable combustion with optimum use of the EGR technique. Another advantage of supplying as large an amount of air as possible to the combustion engine is that the performance of the combustion engine improves.

US2006/0185362 refers to an arrangement for a supercharged combustion engine. The arrangement comprises an inlet line intended to lead air at above atmospheric pressure to the combustion engine. A first compressor is adapted to compressing the air in the inlet line as a first stage and a second compressor is adapted to compressing the air in the inlet line as a second stage. The arrangement comprises a cooling system with a coolant-cooled charge air cooler adapted to cooling the air after it has been compressed in the first stage and before it is compressed in the second stage. An air-cooled charge air cooler is thereafter adapted to cooling the compressed air when it has been compressed in the first stage. Even if the compressed air is cooled between the compressions, it is often at a very high temperature after it has been compressed in the second stage. The air-cooled charge air cooler is therefore likely to have difficulty in effecting cooling of the compressed air to a temperature close to the temperature of the surroundings at which an optimum amount of air can be led to the combustion engine.

SUMMARY OF THE INVENTION

The object of the present invention is to provide an arrangement which makes it possible to supply a substantially optimum amount of air to a supercharged combustion engine.

This object is achieved with the arrangement of the kind mentioned in the introduction. The arrangement thus comprises two compressors which compress the air in two stages. The air will be at a raised pressure and a raised temperature when it has been compressed in the first stage. The cooling of the air after it has been compressed in the first stage leads to its being at a lower temperature but maintaining the same pressure before it is compressed in the second stage. Since the compressor usually has a space with a constant volume in which to receive and compress air, said cooling allows a larger amount of air to be drawn into the second compressor and compressed in the second stage. It also means that a larger amount of air can be compressed to a very high pressure and led to the combustion engine. The intermediate cooling results in the air also being at a lower temperature when it has been compressed in the second stage. The compressed air is nevertheless at such a high temperature after the second compression that it is difficult to cool the air to a desired low temperature in an air-cooled charge air cooler without the dimensions of the latter being too large. This problem is solved by using a second coolant-cooled charge air cooler adapted to precooling the compressed air before it is cooled in the air-cooled charge air cooler. Thus the compressed air is at a low enough temperature when it reaches the air-cooled charge air cooler for it to be possible for it to be cooled therein to a temperature close to the temperature of the surroundings.

According to a preferred embodiment of the present invention, the first coolant-cooled charge air cooler is part of a cooling circuit with a circulating coolant which constitutes a separate cooling system relative to a cooling system intended to cool the combustion engine. The amount of air which can be drawn into the second compressor is thus related to the specific volume of the air, which varies with the temperature of the air. It is therefore important to cool the air to as low a temperature as possible in the first charge air cooler. Using the coolant of the cooling system which cools the combustion engine is relatively simple and functional but not particularly effective, since this coolant is usually at a temperature of 70-100° C. during normal operation of the combustion engine, which would only allow the air to be cooled to a temperature in line with the operating temperature of the coolant. It is therefore advantageous to use a separate cooling system for cooling the compressed air between compression stages. The separate cooling circuit may comprise a radiator element in which the circulating coolant is adapted to being cooled by air. Air is readily available and can easily be caused to flow through the radiator element in order to increase the cooling effect of the circulating coolant. A radiator fan and the air flow generated by movement of the vehicle can be used to cause a considerable amount of air to flow through the radiator element. The radiator element is preferably situated in a region in which it is adapted to being cooled by air which is at the temperature of the surroundings, thereby allowing cooling of the coolant in the radiator element to a temperature close to the temperature of the surroundings. With advantage, the separate cooling circuit comprises a line adapted to leading the coolant from the radiator element to the first charge air cooler without the coolant undergoing substantially any warming on its way between the radiator element and the first charge air cooler. The coolant will therefore be able to cool the compressed air in the first charge air cooler to a temperature close to the temperature of the surroundings.

According to another preferred embodiment of the invention, the second coolant-cooled charge air cooler is part of said separate cooling system. In this case, the separate cooling system is thus used for cooling the air both when it has been compressed in the first stage and when it has been compressed in the second stage. With advantage, the first coolant-cooled charge air cooler and the second coolant-cooled charge air cooler are arranged in parallel in the separate cooling system. Cold coolant is thus led in parallel to the two charge air coolers so that the compressed air undergoes substantially similar cooling in both charge air coolers. Alternatively, the coolant of the separate cooling system would be led first through the one charge air cooler and thereafter through the second charge air cooler. This might be the case if it is desired to achieve a greater cooling effect of the compressed air in the one charge air cooler.

According to another preferred embodiment of the invention, the separate cooling system comprises an EGR cooler adapted to cooling the recirculating exhaust gases in the return line. In this case, the separate cooling circuit may comprise a line adapted to leading the coolant from the first charge air cooler to the EGR cooler in which it is intended to cool the recirculating exhaust gases in the return line. The separate cooling system can thus also be used for cooling the recirculating exhaust gases. The combustion engine is thus provided with an EGR system which has the function of lowering the content of nitrogen oxides in the exhaust gases. It is particularly in connection with such a system that it is extremely important to provide a large air flow to the combustion engine so that the EGR system can be used in such a way that the content of nitrogen oxides is reduced in a substantially optimum manner. The arrangement comprises with advantage an air-cooled EGR cooler adapted to cooling the recirculating exhaust gases. The air-cooled EGR cooler is preferably adapted to subjecting the recirculating exhaust gases to a second stage of cooling and is fitted in a region where it is adapted to having air at the temperature of the surroundings flowing through it. Thus the recirculating exhaust gases can also be cooled to a temperature close to the temperature of the surroundings.

According to another embodiment of the invention, the second coolant-cooled charge air cooler is part of a cooling circuit which itself forms part of a cooling system intended to cool the combustion engine. As the second charge air cooler has the function of precooling the air before it is cooled in the air-cooled charge air cooler, the requirement for the coolant to be at a low temperature is not as high here. In this case it is thus possible to utilise the relatively warm coolant which is circulated in the cooling system of the combustion engine. At least one of said compressors may be part of a turbo unit which comprises a turbine adapted to being driven by the exhaust gases in the exhaust line. With advantage, the arrangement comprises two turbines which extract from the exhaust gases energy which is utilised for driving said compressors and compressing the air in two stages.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
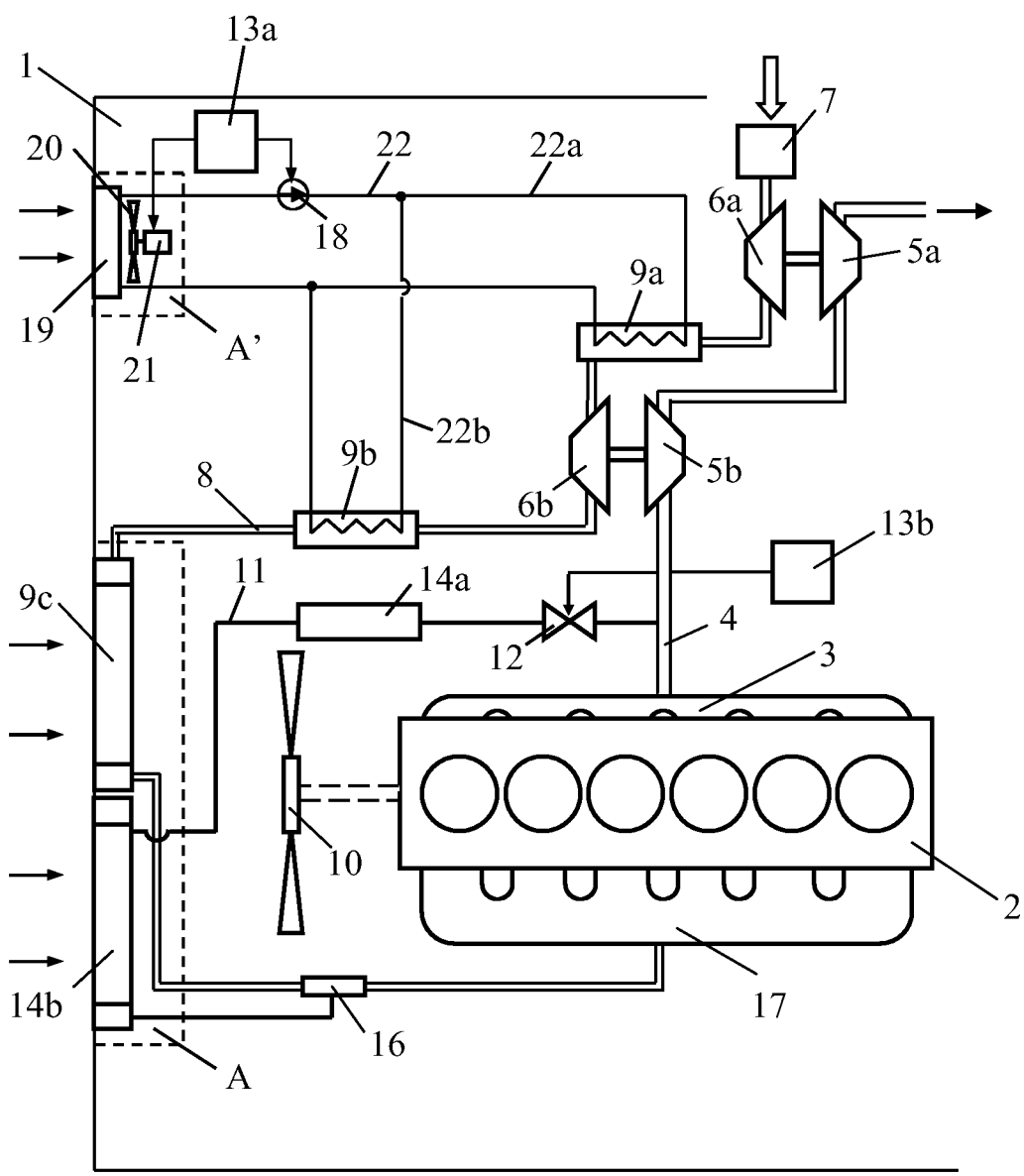
FIG. 1 depicts an arrangement for a supercharged combustion engine according to a first embodiment of the invention.

FIG. 1 depicts an arrangement for a supercharged combustion engine adapted to powering a schematically depicted vehicle 1. The combustion engine is here exemplified as a diesel engine 2. The diesel engine 2 may be intended to power a heavy vehicle 1. The exhaust gases from the cylinders of the diesel engine 2 are led via an exhaust manifold 3 to an exhaust line 4. The diesel engine 2 is provided with a first turbo unit comprising a turbine 5a and a compressor 6a, and a second turbo unit comprising a turbine 5b and a compressor 6b. The exhaust gases in the exhaust line 4, which are at above atmospheric pressure, are led initially to the turbine 5b of the second turbo unit. The turbine 5b is thus provided with driving power which is transmitted, via a connection, to the compressor 6b of the second turbo unit. The exhaust gases are led thereafter via the exhaust line 4 to the turbine 5a of the first turbo unit. The turbine 5a is thus provided with driving power which is transmitted, via a connection, to the compressor 6a of the first turbo unit.

The compressor 6a of the first turbo unit thus compresses air which is drawn into an air inlet line 8 via an air filter 7. The air in the inlet line is cooled initially in a first coolant-cooled charge air cooler 9a which is a component of a separate cooling system with a coolant circulated by a coolant pump 18 in a closed line circuit 22. The separate cooling system comprises also a second coolant-cooled charge air cooler 9b adapted to cooling the compressed air as a second stage after it has been compressed in the compressor 6b. The separate cooling system comprises also a radiator element 19 fitted in a peripheral region A' of the vehicle 1. In this case the peripheral region A' is situated at a front portion of the vehicle 1. A radiator fan 20 is adapted to providing a flow of surrounding air through the radiator element 19. The radiator fan 20 is driven by an electric motor 21. The coolant is cooled in the radiator element 19 by air which is at the temperature of the surroundings. The cold coolant from the radiator element 19 is circulated in parallel to the first charge air cooler 9a and to the second charge air cooler 9b via two parallel lines 22a, b. The coolant will thus be at substantially the same temperature when it reaches the first charge air cooler 9a and the second charge air cooler 9b as when it leaves the radiator element 19. It is therefore possible to cool the compressed air both in the first charge air cooler 9a and in the second charge air cooler 9b to a relatively low temperature. When the coolant has passed through the charge air coolers 9a, b, the parallel lines 22a, b are brought together, after which the coolant is led to the radiator element 19 via a common line 22.

A first control element 13a is adapted to controlling the coolant pump 18 in the separate cooling circuit. Thus the coolant flow in the separate cooling circuit can be varied. The first control unit 13a is also adapted to controlling the radiator fan 20 in the separate cooling system. The cooling of the coolant in the radiator element 19 can thus be varied. The compressed and cooled air leaving the second charge air cooler 9b is led to an air-cooled third charge air cooler 9c. The third charge air cooler 9c is arranged in a peripheral region A of the vehicle 1, which in this case is at a front portion of the vehicle 1. The compressed air is cooled in the third charge air cooler 9c by surrounding air which is caused to flow through the charge air cooler 9c by a radiator fan 10 and the air flow generated by movement of the vehicle. The radiator fan 10 is driven by the diesel engine 2 via a suitable connection.

An arrangement for providing recirculation of part of the exhaust gases in the exhaust line 4 comprises a return line 11 which extends between the exhaust line 4 and the inlet line 8. The return line 11 comprises an EGR valve 12 by which the exhaust flow in the return line 11 can be shut off. The EGR valve 12 may also be used for steplessly controlling the amount of exhaust gases which is led from the exhaust line 4 to the inlet line 8 via the return line 11. A second control unit 13b is adapted to controlling the EGR valve 12 on the basis of information about the current operating state of the diesel engine 2. The second control unit 13b may be a computer unit provided with suitable software. The return line 11 comprises a first EGR cooler 14a for cooling the exhaust gases as a first stage and a second EGR cooler 14b for cooling the exhaust gases as a second stage. In certain operating states of supercharged diesel engines 2, the pressure of the exhaust gases in the exhaust line 4 will be lower than the pressure of the compressed air in the inlet line 8. In such operating situations it is not possible to mix the exhaust gases in the return line 11 directly with the compressed air in the inlet line 8 without special auxiliary means. To this end it is possible to use, for example, a venturi 16 or a turbo unit with variable geometry. If the combustion engine 2 is instead a supercharged Otto engine, the exhaust gases in the return line 11 can be led directly into the inlet line 8, since in substantially all operating states of an Otto engine the exhaust gases in the exhaust line 4 will be at a higher pressure than the compressed air in the inlet line 8. When the exhaust gases have mixed with the compressed air in the inlet line 8, the mixture is led, via a manifold 17, to the respective cylinders of the diesel engine 2.

During operation of the diesel engine 2, exhaust gases flow through the exhaust line 4 and drive the turbines 5a, b of the turbo units. The turbines 5a, b are thus provided with driving power which drives the compressors 6a, b of the turbo units. The compressor 6a of the first turbo unit draws surrounding air in via the air filter 7 and compresses the air in the inlet line 8 as a first stage. The air thus acquires a raised pressure and a raised temperature. The compressed air is cooled in the first charge air cooler 9a by the coolant of the separate cooling system. If the cooling of the air in the first charge air cooler 9a needs boosting, the first control unit 13a can cause the coolant pump 18 to increase the coolant flow through the first charge air cooler 9a, and/or cause the radiator fan 20 to boost the cooling of the circulating coolant in the radiator element 19. The coolant may thus be at a temperature substantially corresponding to the temperature of the surroundings when it reaches the first charge air cooler 9a and the second charge air cooler 9b, thus allowing the compressed air to be cooled to a temperature close to the temperature of the surroundings in the first charge air cooler 9a. The air maintains its pressure during the cooling in the first charge air cooler 9a. Air which is cooled assumes a lower specific volume, i.e. occupies a smaller volume per unit weight. The air thus becomes more compact. A compressor normally has a space with a constant volume in which to receive and compress air. The cooling of the air in the first charge air cooler 9a thus makes it possible for a larger amount of air to be compressed in the compressor 6b of the second turbo unit. The air is here compressed in a second stage so that it assumes a further raised pressure. The compressed air is led thereafter through the second charge air cooler 9b, in which it is again cooled by coolant from the separate cooling system. Thus the air will be at a relatively low temperature when it reaches the third charge air cooler 9c, in which it is cooled by surrounding air. The compressed air can here be cooled to a temperature close to the temperature of the surroundings.

In most operating states of the diesel engine 2, the second control unit 13b will keep the EGR valve 12 open so that part of the exhaust gases in the exhaust line 4 is led into the return line 11. The exhaust gases in the exhaust line 4 may be at a temperature of about 500-600° C. when they reach the first EGR cooler 14a. The recirculating exhaust gases are cooled in the first EGR cooler 14a as a first stage. The coolant of the cooling system which cools the diesel engine may here be used as cooling means. During normal operation of the vehicle, this coolant will be at a temperature within the range 70-100° C. The recirculating exhaust gases can therefore be cooled as a first stage to a temperature close to the temperature of the coolant. Thereafter the recirculating exhaust gases are led to the second EGR cooler 14b situated in a peripheral region A of the vehicle 1. The second EGR cooler 14b has air at the temperature of the surroundings flowing through it. With a suitably dimensioned second EGR cooler 14b, the recirculating exhaust gases can be cooled to a temperature substantially corresponding to the temperature of the surroundings. Exhaust gases in the return line 11 can thus undergo cooling to substantially the same temperature as the compressed air in the third charge air cooler 9c.

The recirculating exhaust gases are thus cooled to a temperature substantially corresponding to the temperature of the surroundings before they are mixed with the air and led into the combustion engine 2. The compressed air is cooled in three stages. Its cooling between the compressions in the compressors 6a, b results in the air assuming a relatively small specific volume when it is compressed by the compressor 6b in the second stage. Thus a relatively large amount of air can be compressed by the compressor 6b in the second stage. The compressed air is cooled thereafter in the second charge air cooler to a relatively low temperature before it undergoes cooling in the air-cooled third charge air cooler 9c to a temperature close to the temperature of the surroundings. Both the exhaust gases and the compressed air will thus be at a temperature substantially corresponding to the temperature of the surroundings when they mix, thereby making it possible for a substantially optimum amount of recirculating exhaust gases and a substantially optimum amount of air to be led into the combustion engine at a high pressure and consequently affording the possibility of combustion in the combustion engine with a substantially optimum reduction of the nitrogen oxides in the exhaust gases. A low temperature of the compressed air and a low temperature of the recirculating exhaust gases when they are led into the combustion engine 2 also result in a lower combustion temperature and hence a lower content of nitrogen oxides in the exhaust gases. The arrangement thus makes it possible to supply a substantially optimum amount of air to the combustion engine, thereby also improving the performance of the combustion engine.

Figure 2:
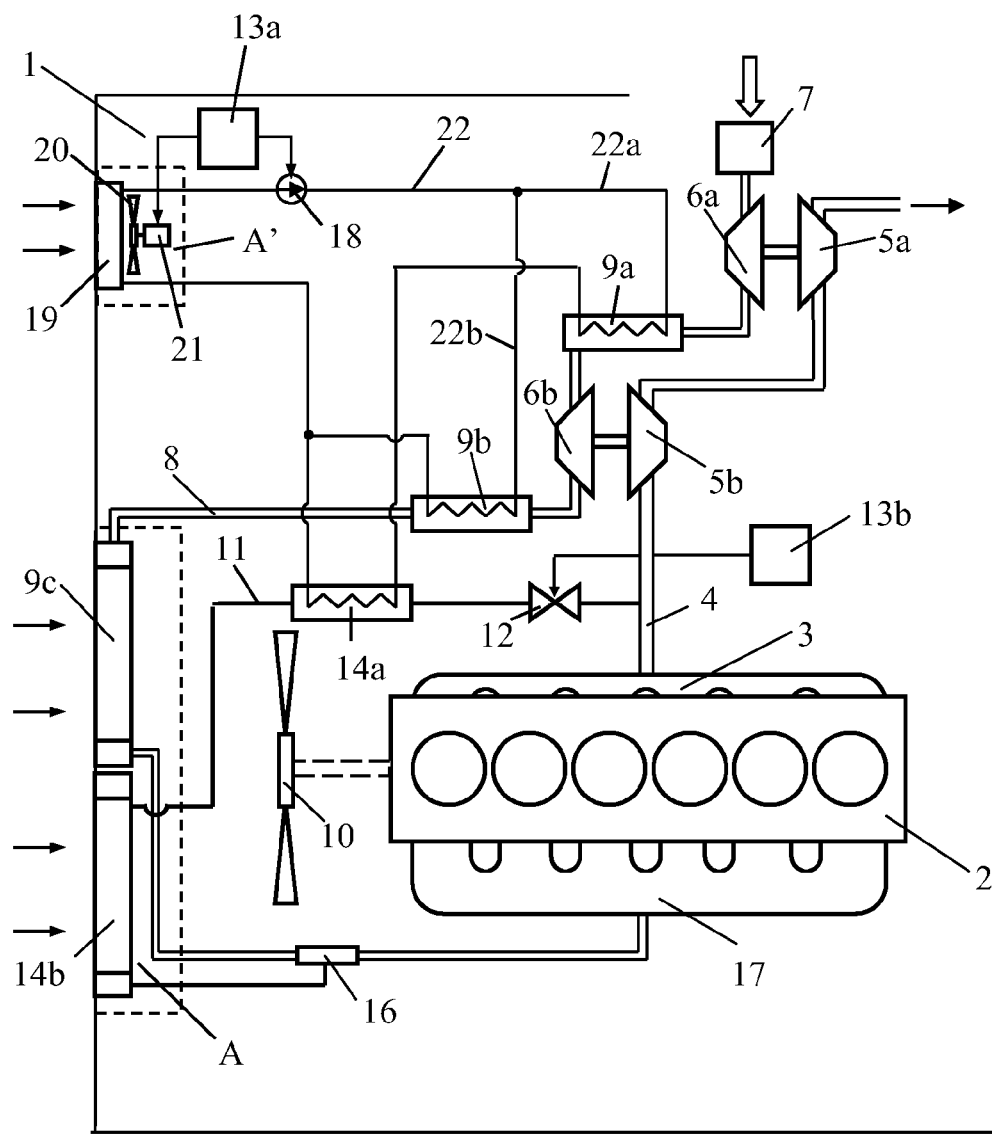
FIG. 2 depicts an arrangement for a supercharged combustion engine according to a second embodiment of the invention.

FIG. 2 depicts an alternative arrangement for a supercharged diesel engine 2. In this case the separate cooling system is used for cooling also the recirculating exhaust gases in the first EGR cooler 14a. The coolant is cooled in the radiator element 19 by means of surrounding air. The coolant led from the radiator element 19 and through the parallel line 22a cools first the air in the first charge air cooler 9a. The coolant is thereafter led on to the first EGR cooler 14a, in which it subjects the recirculating exhaust gases to a first stage of cooling. The coolant will here be at a raised temperature, since it will have already been used for cooling the air in the first charge air cooler 9a. The coolant will nevertheless be at a considerably lower temperature than the recirculating exhaust gases, which may be at a temperature of about 500-600° C. The recirculating exhaust gases can thus be cooled as a first stage to a temperature close to the temperature of the coolant. When the coolant has passed through the first EGR cooler 14a, the line 22a joins the line 22b, after which the coolant is led to the radiator element 19 via a common line 22.

Figure 3:
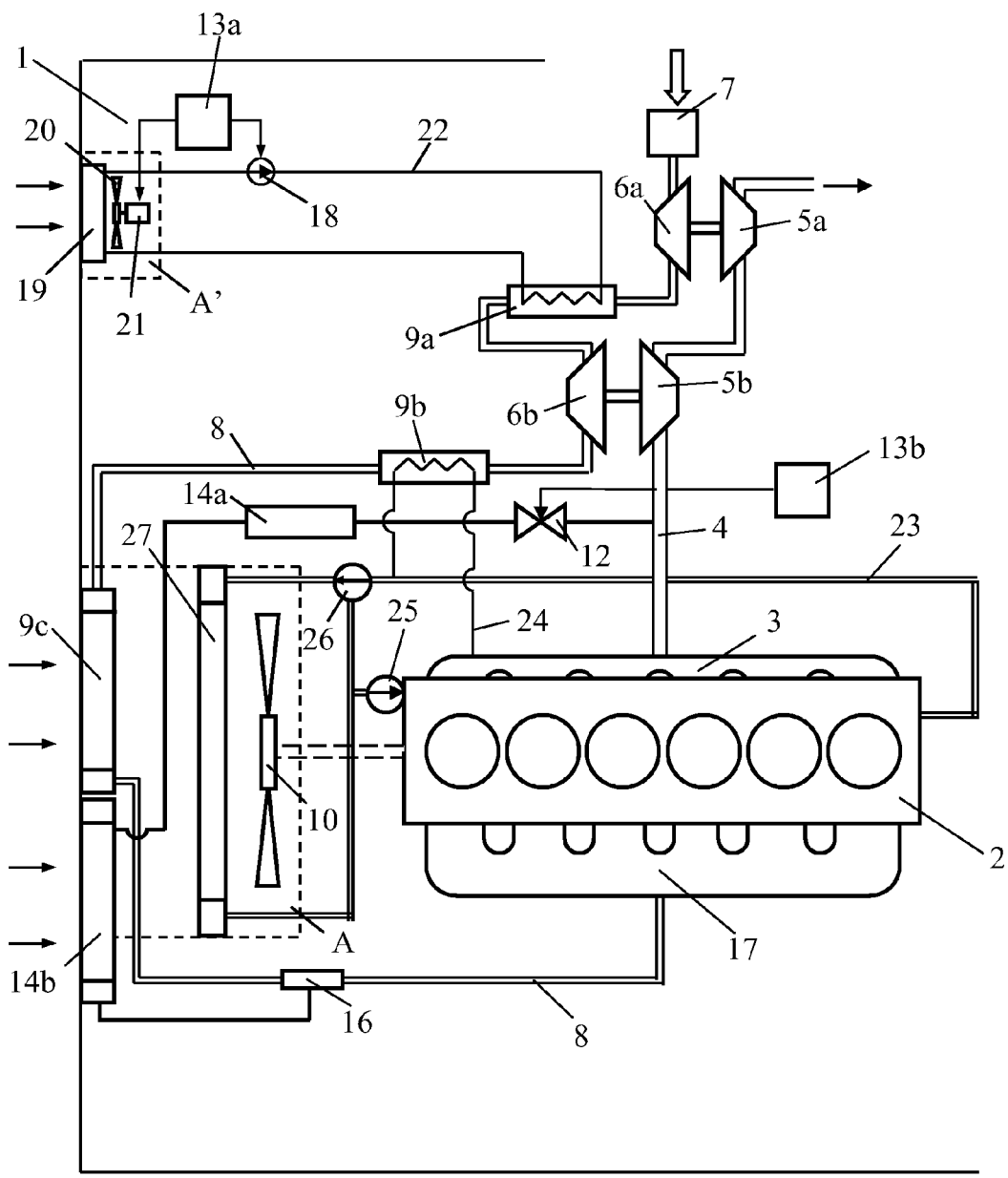
FIG. 3 depicts an arrangement for a supercharged combustion engine according to a third embodiment of the invention and FIG. 4 depicts an arrangement for a supercharged combustion engine according to a fourth embodiment of the invention.

FIG. 3 depicts an alternative arrangement for a supercharged diesel engine 2. In this case the separate cooling system is used only to cool the compressed air in the first charge air cooler 9a. The coolant in the diesel engine's cooling system is used for cooling the compressed air in the second charge air cooler 9b. The diesel engine's cooling system contains a circulating coolant circulated by a coolant pump 25. The cooling system comprises also a thermostat 26 and a radiator 27 which is fitted at a forward portion of the vehicle 1 in the region A. The radiator 27 is fitted downstream of the charge air cooler 9c and the second EGR cooler 14b with respect to the intended direction of air flow in the region A. The coolant is here led in a line 24 from the combustion engine 2 to the second charge air cooler 9b. When the coolant has cooled the compressed air in the second charge air cooler 9b, it is led back to a line 23 of the cooling system. Otherwise the arrangement comprises components corresponding to those in the embodiments described above.

Figure 4:
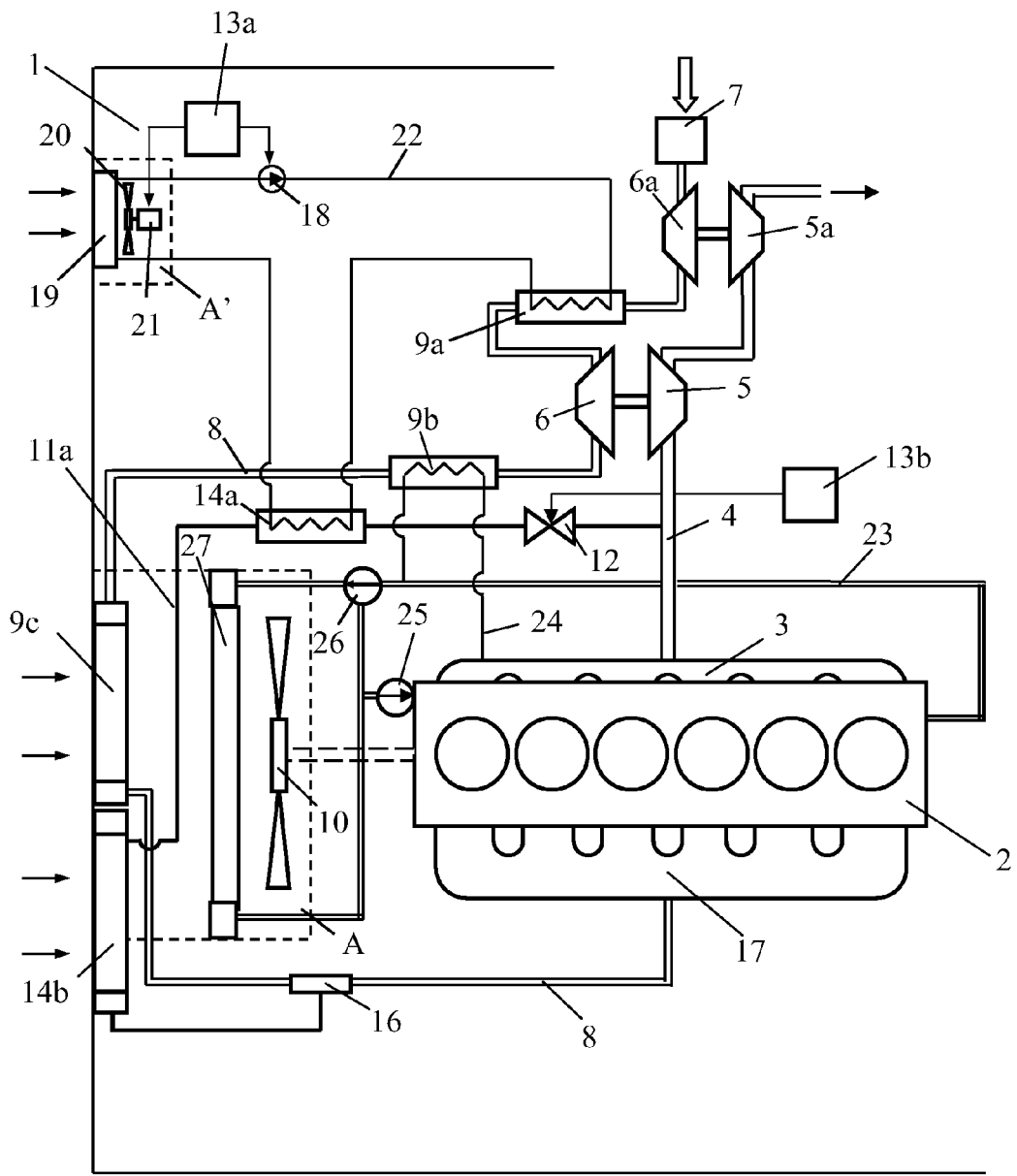

FIG. 4 depicts a further alternative arrangement for a supercharged diesel engine 2. In this case the separate cooling system is used both for cooling the compressed air in the first charge air cooler 9a and for cooling the recirculating exhaust gases in the first EGR cooler 14a. Otherwise the configuration of this arrangement corresponds to that of the arrangement in FIG. 3.

The invention is in no way limited to the embodiments described with reference to the drawings but may be varied freely within the scopes of the claims.

The invention claimed is:

1. An arrangement for a supercharged combustion engine, which arrangement comprises
an exhaust line for connection to the engine to lead exhaust gases out from the combustion engine, an inlet line for connection to the engine to lead air at above atmospheric pressure to the combustion engine,
a first compressor on the inlet line and configured and operable for compressing the air in the inlet line as a first stage,
a second compressor on the inlet line located after the first compressor and configured and operable for compressing the air in the inlet line as a second stage after the first stage,
a first coolant-cooled charge air cooler on the inlet line located after the first compressor and before the second compressor and configured and operable for cooling the air in the inlet line after the air has been compressed in the first stage and before the air is compressed in the second stage,
an air-cooled charge air cooler on the inlet line and configured and operable for cooling the compressed air after it has been compressed in the second stage,
a second coolant-cooled charge air cooler on the inlet line and located after the second compressor and before the air-cooled charge air cooler and configured and operable for cooling the compressed air after the air has been compressed in the second stage and before the air is cooled in the air-cooled charge air cooler,
a return line connected with the exhaust line to receive and recirculate the exhaust gases, the return line being connected to the inlet line for recirculating exhaust gases into the inlet line for mixing the exhaust gases into the compressed air before the inlet line leads into the engine,
a cooling circuit with a circulating coolant, the cooling circuit comprising a separate cooling system separate from a cooling system operable for cooling the combustion engine, and at least the first coolant-cooled charge air cooler is part of the cooling circuit, and
a first EGR cooler and a second EGR cooler, the first and the second EGR coolers being configured and operable for cooling the recirculating exhaust gases in the return line, the first and the second EGR coolers not being part of the cooling circuit.

2. The arrangement according to claim 1, wherein at least one of the compressors is part of a turbo unit comprising a turbine configured and located for being driven by the exhaust gases in the exhaust line.

3. The arrangement according to claim 1, wherein the separate cooling system comprises a radiator element configured and operable for the circulating coolant to be cooled by air.

4. The arrangement according to claim 3, wherein the radiator element is situated in a region at the engine at which the radiator element is cooled by air which is at the temperature of the surroundings.

5. The arrangement according to claim 1, wherein the second coolant-cooled charge air cooler is also part of the separate cooling system.

6. The arrangement according to claim 5, wherein the first coolant-cooled charge air cooler and the second coolant-cooled charge air cooler are arranged in parallel in the separate cooling system, such that each of the coolant-cooled charge air coolers receives coolant at the same temperature.

7. An arrangement for a supercharged combustion engine, which arrangement comprises
an exhaust line for connection to the engine to lead exhaust gases out from the combustion engine, an inlet line for connection to the engine to lead air at above atmospheric pressure to the combustion engine,
a first compressor on the inlet line and configured and operable for compressing the air in the inlet line as a first stage,
a second compressor on the inlet line located after the first compressor and configured and operable for compressing the air in the inlet line as a second stage after the first stage,
a first coolant-cooled charge air cooler on the inlet line located after the first compressor and before the second compressor and configured and operable for cooling the air in the inlet line after the air has been compressed in the first stage and before the air is compressed in the second stage,
an air-cooled charge air cooler on the inlet line and configured and operable for cooling the compressed air after it has been compressed in the second stage, a second coolant-cooled charge air cooler on the inlet line and located after the second compressor and before the air-cooled charge air cooler and configured and operable for cooling the compressed air after the air has been compressed in the second stage and before the air is cooled in the air-cooled charge air cooler, a return line connected with the exhaust line to receive and recirculate the exhaust gases, the return line being connected to the inlet line for recirculating exhaust gases into the inlet line for mixing the exhaust gases into the compressed air before the inlet line leads into the engine, a cooling circuit with a circulating coolant, the cooling circuit comprising a separate cooling system separate from a cooling system operable for cooling the combustion engine, and at least the first coolant-cooled charge air cooler is part of the cooling circuit, and an air-cooled EGR cooler configured and operable for cooling the recirculating exhaust gases in the return line, the air-cooled EGR cooler not being part of the cooling circuit, wherein the separate cooling system comprises a second EGR cooler in the return line and configured and operable for cooling the recirculating exhaust gases in the return line.

8. An arrangement for a supercharged combustion engine, which arrangement comprises an exhaust line for connection to the engine to lead exhaust gases out from the combustion engine, an inlet line for connection to the engine to lead air at above atmospheric pressure to the combustion engine, a first compressor on the inlet line and configured and operable for compressing the air in the inlet line as a first stage, a second compressor on the inlet line located after the first compressor and configured and operable for compressing the air in the inlet line as a second stage after the first stage, a first coolant-cooled charge air cooler on the inlet line located after the first compressor and before the second compressor and configured and operable for cooling the air in the inlet line after the air has been compressed in the first stage and before the air is compressed in the second stage, an air-cooled charge air cooler on the inlet line and configured and operable for cooling the compressed air after it has been compressed in the second stage, a second coolant-cooled charge air cooler on the inlet line and located after the second compressor and before the air-cooled charge air cooler and configured and operable for cooling the compressed air after the air has been compressed in the second stage and before the air is cooled in the air-cooled charge air cooler, a return line connected with the exhaust line to receive and recirculate the exhaust gases, the return line being connected to the inlet line for recirculating exhaust gases into the inlet line for mixing the exhaust gases into the compressed air before the inlet line leads into the engine, a cooling circuit with a circulating coolant, the cooling circuit comprising a separate cooling system separate from a cooling system operable for cooling the combustion engine, and at least the first coolant-cooled charge air cooler is part of the cooling circuit, an air-cooled EGR cooler configured and operable for cooling the recirculating exhaust gases in the return line, the air-cooled EGR cooler not being part of the cooling circuit, and a second cooling circuit with a circulating coolant which forms part of the cooling system for cooling the combustion engine, and the second coolant-cooled charge air cooler is in the second cooling circuit.

9. A supercharged combustion engine, comprising:

an exhaust line for exhausting combustion exhaust gases from the engine, an inlet line for feeding to the engine air mixed with exhaust gases from the engine, starting from the engine, a first turbine on the exhaust line configured for being driven by exhaust gases, followed by a second turbine on the exhaust line configured for being driven by the exhaust gases;

on the inlet line, a first air compressor connected with the second turbine for being driven by the second turbine;

a first cooler on the inlet line following the first compressor, the first cooler being configured and operable for cooling air in the inlet line that was compressed in the first compressor;

a second air compressor on the inlet line following the first cooler, the second compressor being connected with the first turbine for being driven by the first turbine;

a second cooler on the inlet line following the second compressor, the second cooler being configured and operable for cooling air compressed in the second compressor;

an exhaust gas return line recirculating exhaust gases from the exhaust line to the inlet line, a connection of the return line with the inlet line following the first and second coolers for mixing recirculated exhaust gases and air before the line leads into the engine, a cooling circuit with a circulating coolant, the cooling circuit comprising a separate cooling system separate from a cooling system operable for cooling the engine, and at least the first cooler is part of the cooling circuit, and an EGR cooler which is disposed on the return line and is configured and operable for cooling the recirculating exhaust gases in the return line, the EGR cooler being part of the cooling circuit, the circulating coolant leaving the first cooler and entering the EGR cooler.

10. The supercharged combustion engine of claim 9, further comprising a third cooler on the return line for the exhaust gases and located before the connection of the return line to the inlet line.

11. The supercharged combustion engine of claim 10, wherein the third cooler on the return line comprises a second EGR cooler.

12. The supercharged combustion engine of claim 9, wherein the first and the second coolers are coolant-cooled charge air coolers; the cooling circuit with the circulating coolant being connected with each of the first and second coolant-cooled charge air coolers for cooling them.

13. The supercharged combustion engine of claim 12, further comprising an air cooled charge air cooler on the inlet line after the second coolant-cooled charge air cooler and before the connection of the inlet line to the return line.

* * * * *

UNITED STATES PATENT AND TRADEMARK OFFICE
CERTIFICATE OF CORRECTION

PATENT NO.        : 8,695,340 B2                                                        Page 1 of 1
APPLICATION NO.  : 12/741625
DATED             : April 15, 2014
INVENTOR(S)       : Kardos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 651 days.

Signed and Sealed this
Twenty-ninth Day of September, 2015

Michelle K. Lee
*Director of the United States Patent and Trademark Office*